(12) United States Patent
Dandia et al.

(10) Patent No.: US 8,935,656 B2
(45) Date of Patent: Jan. 13, 2015

(54) COMMUNICATING INFORMATION IN COMPUTING SYSTEMS

(75) Inventors: Hanif M. Dandia, Poughkeepsie, NY (US); Thomas E. Murphy, Jr., Poughkeepsie, NY (US); Frank J. Robyck, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 12/555,889

(22) Filed: Sep. 9, 2009

(65) Prior Publication Data

US 2011/0061044 A1 Mar. 10, 2011

(51) Int. Cl.
*G06F 9/44* (2006.01)

(52) U.S. Cl.
CPC ..................... *G06F 9/4446* (2013.01)
USPC ........... 717/103; 717/102; 717/117; 717/109; 717/111; 709/201; 709/203; 715/727

(58) Field of Classification Search
None
See application file for complete search history.

(56) References Cited

U.S. PATENT DOCUMENTS

| | | | |
|---|---|---|---|
| 5,283,861 A * | 2/1994 | Dangler et al. | 715/740 |
| 5,436,963 A | 7/1995 | Fitzpatrick et al. | |
| 5,524,199 A * | 6/1996 | Orton et al. | 715/790 |
| 6,009,398 A * | 12/1999 | Mueller et al. | 704/275 |
| 6,052,735 A * | 4/2000 | Ulrich et al. | 709/236 |
| 6,182,041 B1 | 1/2001 | Li et al. | |
| 6,216,158 B1 * | 4/2001 | Luo et al. | 709/217 |
| 6,791,904 B1 * | 9/2004 | Herron et al. | 368/13 |
| 6,885,736 B2 | 4/2005 | Uppaluru | |
| 7,054,918 B2 | 5/2006 | Polcyn | |
| 7,197,960 B2 | 4/2007 | Lew et al. | |
| 7,398,061 B2 * | 7/2008 | Mousseau | 455/90.2 |
| 7,466,810 B1 * | 12/2008 | Quon et al. | 379/201.01 |
| 7,606,732 B2 * | 10/2009 | Raghunathan et al. | 705/15 |
| 7,676,294 B2 * | 3/2010 | Baier et al. | 700/108 |
| 7,694,313 B2 * | 4/2010 | O'Shaughnessy et al. | 719/321 |
| 8,019,632 B2 * | 9/2011 | Niheu et al. | 705/7.11 |
| 8,205,217 B2 * | 6/2012 | Kennedy et al. | 719/327 |
| 8,307,331 B2 * | 11/2012 | Warila et al. | 717/109 |
| 2002/0197955 A1 * | 12/2002 | Witkowski et al. | 455/41 |
| 2003/0145020 A1 * | 7/2003 | Ngo et al. | 707/201 |
| 2003/0212559 A1 | 11/2003 | Xie | |
| 2004/0258216 A1 * | 12/2004 | Reid | 379/88.13 |
| 2005/0091670 A1 * | 4/2005 | Karatal et al. | 719/328 |
| 2005/0197840 A1 | 9/2005 | Wang et al. | |
| 2006/0083357 A1 * | 4/2006 | Howell et al. | 379/88.04 |
| 2006/0085417 A1 * | 4/2006 | John et al. | 707/6 |

(Continued)

OTHER PUBLICATIONS

K.P. McGlynn, Mail Paging and Reminder Forwarding System, IBM Technical Disclosure Bulliten, vol. 29, No. 12, pp. 5201-5202, May 1987.

(Continued)

*Primary Examiner* — Chameli Das
(74) *Attorney, Agent, or Firm* — Cantor Colburn LLP; William A. Kinnaman, Jr.

(57) ABSTRACT

A system is provided and includes a first computing device operable to execute an application, and a second computing device, remotely and continuously communicable with the first device, by which a non-distractive description of updated information of the application is automatically issuable to a user substantially immediately following an occurrence of the update, wherein a form of the non-distractive description is defined in accordance with an activity currently performed by the user.

20 Claims, 3 Drawing Sheets

(56) References Cited

U.S. PATENT DOCUMENTS

| | | |
|---|---|---|
| 2006/0182235 A1 | 8/2006 | Kraft et al. |
| 2007/0100631 A1 | 5/2007 | Bodin et al. |
| 2007/0124142 A1 | 5/2007 | Mukherjee |
| 2008/0091448 A1* | 4/2008 | Niheu et al. .................. 705/1 |
| 2008/0122796 A1* | 5/2008 | Jobs et al. .................. 345/173 |
| 2009/0210476 A1* | 8/2009 | Levy et al. .................. 709/201 |
| 2010/0100828 A1* | 4/2010 | Khandelwal et al. ......... 715/757 |
| 2010/0174896 A1* | 7/2010 | Gupta .......................... 713/100 |
| 2010/0274869 A1* | 10/2010 | Warila et al. ................. 709/217 |
| 2011/0183714 A1* | 7/2011 | McMahan et al. ............ 455/557 |
| 2012/0036220 A1* | 2/2012 | Dare et al. .................... 709/217 |
| 2014/0108510 A1* | 4/2014 | Schwesig et al. ............. 709/203 |

OTHER PUBLICATIONS

A.D. Moldover, Enhanced Personal Reminder Facility, IBM Technical Disclosure Bulliten, vol. 30, No. 2, pp. 656, Jul. 1987.

J.P. Vincent, Calendar Call Items, IBM Technical Disclosure Bulliten, vol. 32, No. 12, pp. 124-125, May 1990.

\* cited by examiner

US 8,935,656 B2

COMMUNICATING INFORMATION IN COMPUTING SYSTEMS

BACKGROUND

Aspects of the present invention are directed to a system and a method for communicating information.

Calendar applications that stand alone or are coupled to email applications are now commonly employed in personal computing and enterprise computing systems. These applications allow users to establish, modify and update their schedules days, weeks, months and even years in advance. The applications also provide alerts that warn users of upcoming events and fields in which they can save descriptive information relating to the events. Where the applications are employed in personal computing systems, the information they convey is generally limited to personal information of a small number of users. Conversely, in an enterprise computing system, the applications can be used to allow any number of users to access user information. In either case, the applications can be compatible with other calendar applications so that users of disparate systems can mutually schedule events. Where the applications are coupled to email applications, their functionality is generally increased as the information can be accessible and modifiable through email.

A problem exists, however, in that updates to calendar applications may not be immediately transmitted to users and that users, therefore, may not be aware of such updates when such awareness would be helpful to them. For example, if a user is commuting to his office in preparation for a meeting, but the meeting is postponed while he is en route, the user will only know about the postponement if he actively accesses his calendar application and requests updated information. If he is driving, such accessing may be difficult to accomplish, dangerous or, in some cases, illegal.

SUMMARY

In accordance with an aspect of the invention, a system is provided and includes a first computing device operable to execute an application, and a second computing device, capable of remotely and continuously communicating with the first computing device, by which a non-distractive description of updated information of the application is automatically issuable to a user substantially immediately following an occurrence of an update, wherein a form of the non-distractive description is defined in accordance with an activity currently performed by the user.

In accordance with an aspect of the invention, a system is provided and includes a first computing device operable to execute an application, to monitor the application for an update to information thereof and to transmit data reflective of the update and a second computing device, capable of remotely and continuously communicating with the first computing device to be receptive of the transmitted data, by which a non-distractive description of updated information of the application is automatically issuable to a user substantially immediately following an occurrence of the update, wherein a form of the non-distractive description is defined in accordance with an activity currently performed by the user.

In accordance with an aspect of the invention, a method for operating a system is provided and includes executing an application at a first computing device, monitoring the application for an update to information thereof, transmitting data reflective of the update, identifying an activity currently performed by a user and automatically issuing to the user a non-distractive description of updated information of the application in a form defined in accordance with the activity currently performed by the user substantially immediately following an occurrence of the update at a second computing device, which is capable of remotely and continuously communicating with the first computing device to be receptive of the transmitted data.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
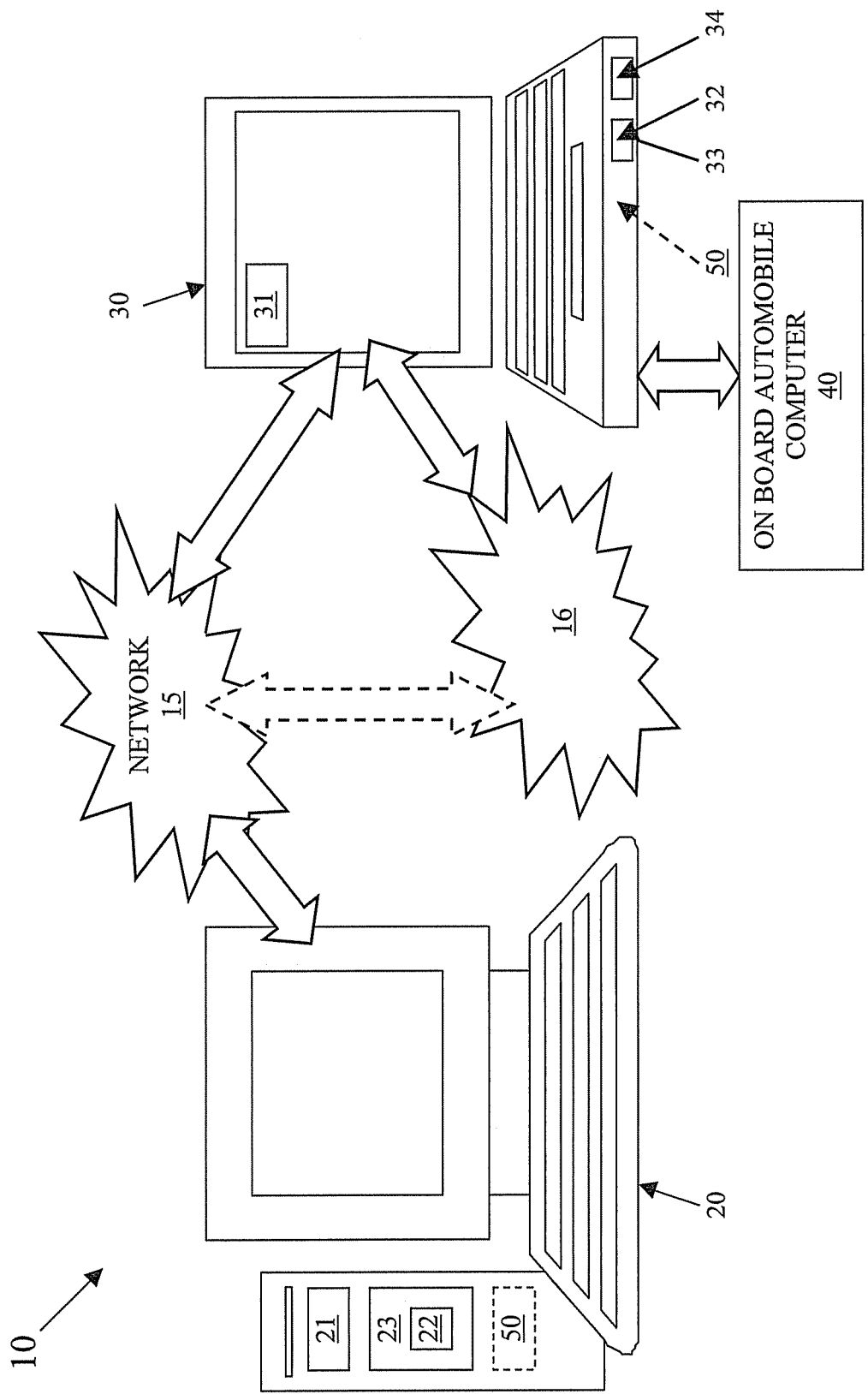
FIG. 1 is a schematic view of a system in accordance with embodiments of the invention.

With reference to FIG. 1, a system 10 is provided and includes a first computing device 20 and a second computing device 30. The first computing device 20 is operable to execute an application, such as a calendar application, a scheduling application, an email application and/or a combination thereof The first computing device 20 includes a processor 21, such as a microprocessor of a central processing unit (CPU), and a first memory unit 22, which is coupled to the processor 21. The first memory unit 22 may include random access memory (RAM), read-only memory (ROM) and other similar types of memory and has a first set of executable instructions 23 stored thereon. When executed, the first set of executable instructions 23 cause the processor 21 to execute the application and, in some cases, additional operations to be discussed below.

The second computing device 30 is remotely and continuously coupled to the first device 20 by way of a network 15, such as the Internet. Both the first and second computing devices 20 and 30 communicate with the network 15 via wired and/or wireless, local and/or wide area networks. Thus, in an exemplary embodiment, the first computing device 20 may communicate with the network 15 via an Ethernet connection and the second device 30 may communicate with the network 15 via a 2G or 3G wireless data standard compliant connection.

The second computing device 30 may include at least an interface 31, such as a display unit, a keypad and/or a speaker, and a second memory unit 32, which is coupled to the interface 31. The second memory unit 32 may be similar in structure and function to the first memory unit 22 and has a second set of executable instructions 33 stored thereon. When executed, the second set of executable instructions 33 cause the interface 31 to automatically issue a non-distractive description of updated information of the application at a time that substantially immediately follows a time of an occurrence of the update. In accordance with embodiments of the invention, a form of the non-distractive description is defined in accordance with an activity currently performed by the user.

In an embodiment of the invention, the non-distractive description of the updated information is issued in real-time following the update. Since the first and second computing devices 20 and 30 are remotely and continuously coupled with one another, no additional control commands are required to be entered by a user of either device.

Where the application is a user's calendaring application, the updated information may relate to the postponement of a meeting the user is rushing by car to attend. Here, the second computing device 30 issues to the user a non-distractive description of the update, which may include an audible summary of the calendar entry made by another meeting invitee to postpone the meeting. That is, the other meeting invitee may provide an inputted command to the application to postpone the meeting by 1 hour. The second device 30, which may include a text-to-speech unit 50, as will be described below, then automatically outputs a message to the user stating "postpone the meeting by 1 hour" with the user not being required to risk his safety by actively operating the second device 30 while driving.

The second device 30 may be configured to only output the message in certain cases. For example, the second device 30 may be configured to monitor the user's calendar for changes occurring relative to a particular calendar period, such as Monday mornings between 9 and 11:00 AM. With this configuration, changes occurring outside of this time period will not be associated with the issuance of the non-distractive description.

Figure 2:
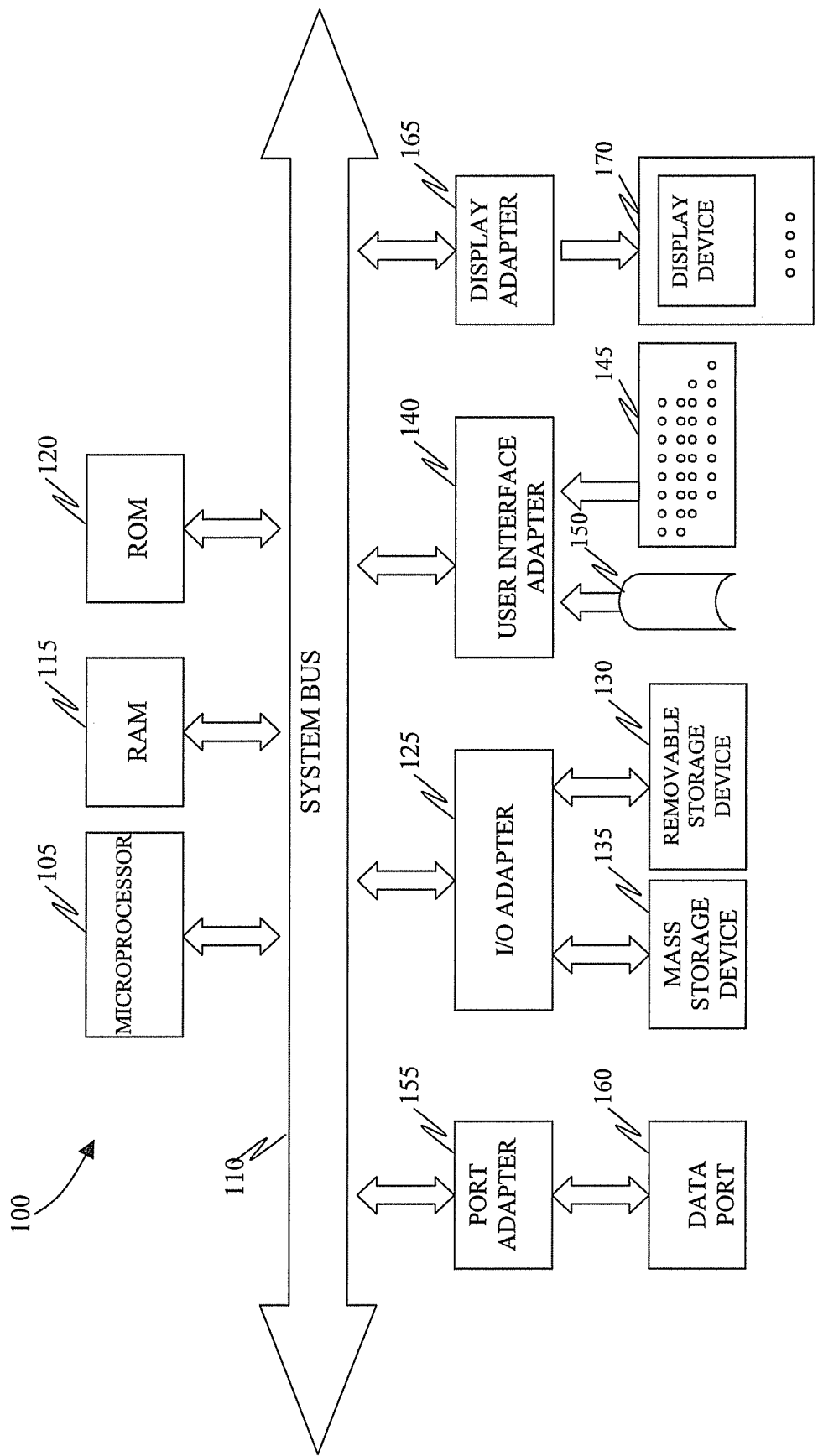
FIG. 2 is a schematic view of a computing device of the system of FIG. 1.

With reference to FIG. 2, both the first and the second computing devices 20 and 30 may include a general purpose computing device 100. As shown in FIG. 2, the computing device 100 may include a microprocessor 105, a system bus 110 to which the microprocessor 105 is coupled and memory units, such as RAM 115 and ROM 120, that may also be coupled to the system bus 110. Further coupled to the system bus 110 may be at least a port adapter 155, which is coupled to a data port 160, and an input/output (I/O) adapter 125, which is coupled to mass and removable storage devices 135 and 130, respectively. A user interface adapter 140 may be coupled to the system bus 110 and to user devices 145 and 150. The user devices 145 and 150 may include a mouse, a mousepad, a keyboard and, in some cases, hands-free input devices, such as speakers and microphones, that allow users to input or receive commands verbally or audibly. A display adapter 165, which is coupled to a display device 170, such a display screen, a monitor or a speaker, may also be coupled to the system bus 110 and allows users to view, listen to and otherwise interact with the application where possible.

An input to the application is receivable via at least one of the first and second computing devices 20 and 30. Similarly, information of the application is accessible via at least one of the first and second computing devices 20 and 30. That is, an authorized user at either or both of the first and second computing devices 20 and 30 can provide inputs to the application to update their schedule and access the information of the application to review meeting notes saved in a calendar entry. Where the user devices 145 and 150 of the first and second computing devices 20 and 30 are hands-free devices, the user can drive a car and still accomplish the accessing and providing of inputs with verbal or audible commands.

The first computing device 20 may be an enterprise computing system (ECS) or a component thereof, such as a client computer networked with the ECS. In this case, the application may be executed as part of an operating system (OS) run on the ECS, with the application being distributed to each user associated with the ECS. In the example in which the application is a combination calendar, scheduling and email application, all of the users of the ECS are each generally enabled to use their email systems to schedule events and meetings with other users and with users of non-affiliated systems, and to update that schedule as required or desired.

In an embodiment of the invention, the first computing device is a domino server or a similar type of server that handles email/calendar applications of employees of a given enterprise. Such a server could add "web services" for providing summary calendar entries for each of the employee's appointments. An exemplary summary calendar entry may be provided as: Meeting/Appointment title at 9:00 AM, Subject: All Hands Meeting, Location: BLDG 705, cafeteria.

The second computing device 30 has at least the capabilities of the first computing device 20 and may additionally be embodied as a mobile computing device, such as a cell phone, a mobile phone, a personal digital assistant (PDA) or some other similar device. The second computing device 30 may be remotely coupled to the first device 20 by way of the network 15 via wired and/or wireless, local and/or wide area networks. The second computing device may be further configured to be Bluetooth enabled or enabled with some other similar system. In this way, as shown in FIG. 1, the second computing device 30 can be communicable with cellular networks 16 and with other similarly configured computing devices, such as the on-board computer 40 of certain automobiles. This way, the second computing device 30 can receive information from the cellular networks 16, transmit that information to the automobile on-board computer 40 and have the automobile speaker system issue the non-distractive description.

As mentioned above, the second computing device 30 may include hands-free technology, such as On Star technology, with a voice response unit (VRU) that employs authentication security via password protocols and menu based mechanisms for making operational selections. The second computing device 30 may further include phonemail or branch exchange (CBX/PBX) like technology that provides for authentication, voice response (VRU), audio phonemail mailboxes and other similar features.

In accordance with embodiments of the invention, the application can be configured by an authorized user to apply a filtering operation to determine which types of updated information necessitate the issuance of non-distractive descriptions thereof and which do not. In the case of the calendaring application, a user can configure the application to only issue non-distractive descriptions of major changes to his schedule, like when imminent meetings are postponed. Minor changes, in this case, such as changes to meeting itineraries would be filtered out. In this way, the number of non-distractive descriptions issued can be reduced or increased in accordance with a user's preference. A preferences configuration screen, such as an options menu, can be provided to allow the user to achieve the desired configuration.

The non-distractive description may be any type of message or provided in any form that can be issued to a person or persons without causing a distraction to the person or persons. Thus, if a person is driving a car, the non-distractive description can be issued in any form that does not inhibit that person from safely operating his vehicle. In some jurisdictions, the extent of what is and is not a safe level of distraction may be established by law and should be considered when designing the options for the non-distractive description. In general, the non-distractive description may include an audible summary calendar entry, which describes for example a new time of a postponed meeting, or a recorded audible message made by a meeting invitee who is postponing the meeting time. In another embodiment, the non-distractive description includes an alert that a non-distractive description is forthcoming that may possibly be paired with at least a portion of the description itself.

The non-distractive description may also be paired with an audible, tactile and/or textual alert of an upcoming description. A non-distractive textual alert of the updated information, such as in a heads-up display of an automobile, can also be issued. With a user having received the non-distractive description, the user can specifically and selectively request the non-distractive description and/or the updated information via at least one of the first and second computing devices 20 and 30 in order to review the information further or take additional steps.

Where the second computing device 30 is generally used for a particular purpose, such as providing a user access to a calendar application while the user is driving a car, the non-distractive description may be normally configured as the audible summary calendar entry or the recorded audible message. In this case, the form of the non-distractive description can generally only be changed by a specific command input by the user. In alternate embodiments, the second computing device 30 may include a processing unit 34 that can identify an activity currently performed by the user, such as driving a car, riding in an elevator, dining at a restaurant, working at his normal office or visiting another office. The processing unit 34 can further control the interface 31 to provide the non-distractive description in a form suitable for the activity. That is, where the user is driving the processing unit 34 can control the interface 31 to issue the non-distractive description as an audible summary calendar entry. If, on the other hand, the user is dining or riding in an elevator, where audible signals are inappropriate, the form may be limited to a vibratory alert that is associated with a textual summary calendar entry. The processing unit 34 can make the activity identification based on various passive and/or active inputs. For example, the processing unit 34 may recognize that the presence of an On Star signal suggests that the user is driving a car whereas the presence of an unknown signal would suggest that the user is visiting another office or dining in a restaurant offering Internet access. In alternate embodiments, the processing unit 34 may also receive inputs from the user as to an identification of the currently performed activity.

The second computing device 30 may also be global positioning system (GPS) capable and may be able to determine that the user is driving or otherwise traveling by motor vehicle on its own based on position and motion data acquired over the course of a predefined time period.

Referring to FIG. 1, the system may include a text-to-speech unit 50 to generate the non-distractive description based on the updated information. As shown, the text-to-speech unit 50 is disposable in signal communication with at least one of the first and second computing devices 20 or 30. That is, in one embodiment, the first computing device 20 includes the processor 21 and the first memory unit 22. Here, the first set of executable instructions 23 causes the processor 21 to execute the application, to monitor the application for the update and to transmit data reflective of the update as a text file. In this embodiment, the second computing device 30 is receptive of the text file and includes the text-to-speech unit 50. The received text file is thereby converted into speech by the text-to-speech unit 50 at the second computing device 30. It is noted, however, that other embodiments are possible. For example, the text-to-speech unit 50 could be disposed within the first computing device 20. Here, the transmitted data received by the second computing device 30 would be a sound file outputted by the text-to-speech unit 50.

The text file could be generated in a manner similar to the operation of instant messaging system currently available, such as AOL Instant Messaging or IBM Lotus Sametime, etc. In these systems, typed "instant messages" or "IMs" include text that is communicated to a client that is appended with To/From and subject information. The text, the To/From and the subject information is then summarized in various types of audio formats.

Figure 3:
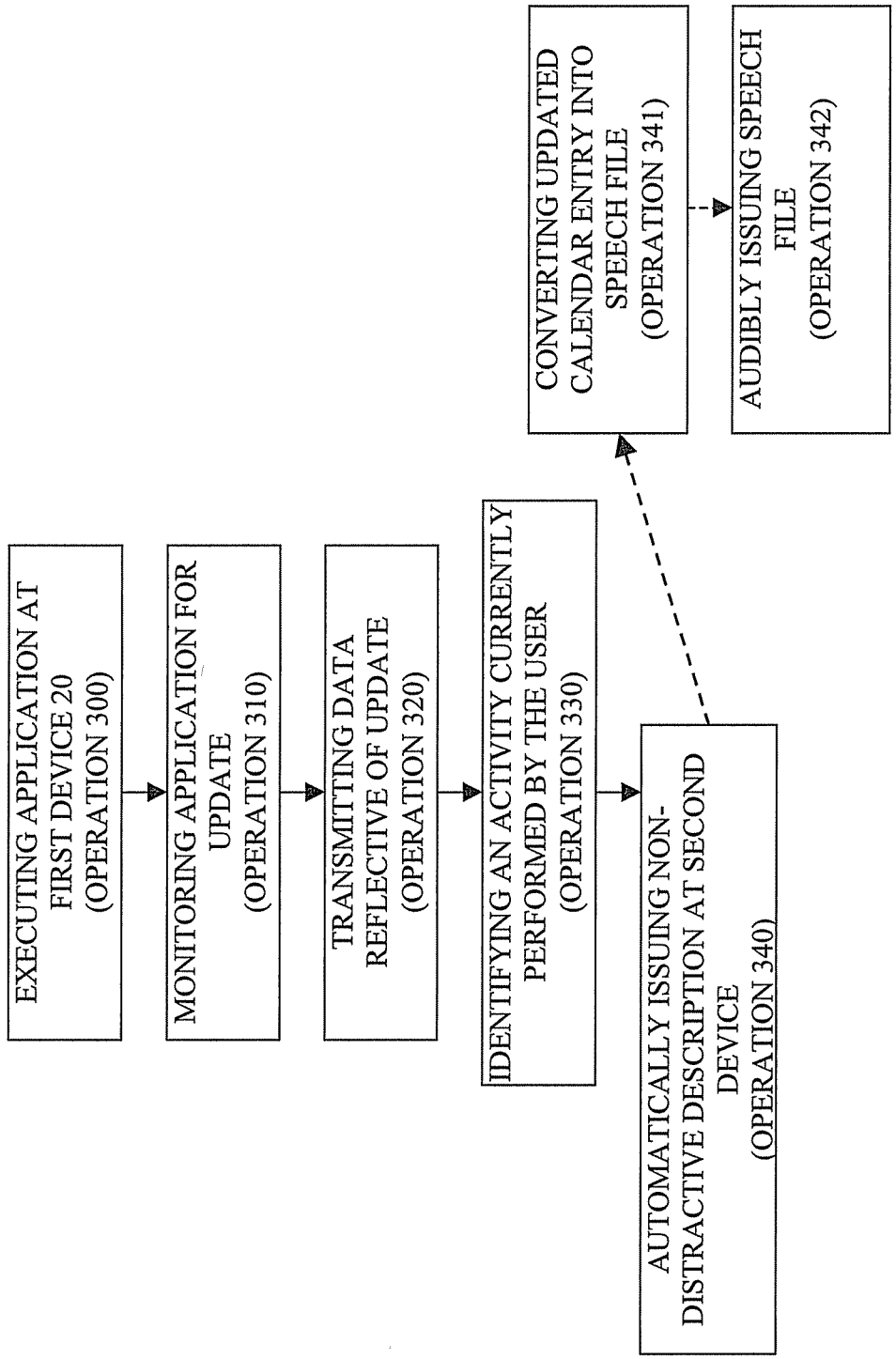
FIG. 3 is a flow diagram illustrating a method in accordance with embodiments of the present invention.

With reference to FIG. 3 and, in accordance with another aspect of the invention, a method for operating a system is provided and includes executing an application at a first computing device 20 (operation 300), monitoring the application for an update to information thereof (operation 310), transmitting data reflective of the update (operation 320), identifying an activity currently performed by a user (operation 330) and automatically issuing to the user a non-distractive description of updated information of the application in a form defined in accordance with the activity currently performed by the user substantially immediately following an occurrence of the update at a second computing device 30 (operation 340). As described above, the second computing device 30 is remotely communicable with the first computing device 20 to be receptive of the transmitted data. In addition, as described above, the application may include a calendar application. Here, the issuing may include converting an updated calendar entry into a speech file (operation 341) and then audibly issuing the speech file (operation 342).

The method illustrated in FIG. 3 may be embodied as executable instructions stored on a computer readable medium, which, when executed, cause one or more computing devices to execute the method.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A system, comprising:
a first computing device operable to execute an application; and
a second computing device, capable of remotely and continuously communicating with the first computing device, by which a non-distractive description of updated information of the application is automatically issuable to a user immediately following an occurrence of an update,
wherein a form of the non-distractive description is defined in accordance with an activity currently performed by the user and the updated information is filtered from a set of changes to the application in accordance with predefined filter rules and number of non-distractive descriptions issued can be reduced or increased in accordance with an authorized user preference, and a preference configuration screen is provided to allow the authorized user to achieve a desired configuration.

2. The system according to claim 1, wherein the first computing device is a component of an enterprise computing system.

3. The system according to claim 1, wherein the second computing device is a mobile computing device.

4. The system according to claim 1, wherein an input to the application is receivable via at least one of the first and second computing devices.

5. The system according to claim 1, wherein the information of the application is accessible via at least one of the first and second computing devices.

6. The system according to claim 1, wherein the application comprises at least one of a calendar, a scheduling and/or an email application.

7. The system according to claim 1, wherein the non-distractive description comprises an audible summary calendar entry.

8. The system according to claim 1, wherein the non-distractive description comprises a recorded audible message.

9. The system according to claim 1, wherein the non-distractive description and the updated information are requestable via at least one of the first and second computing devices.

10. The system according to claim 1, further comprising a text-to-speech unit to generate the non-distractive description based on the updated information.

11. The system according to claim 10, wherein the text-to-speech unit communicates with at least one of the first and second computing devices.

12. The system according to claim 1, wherein the second computing device is operable in a hands-free mode.

13. The system according to claim 1, wherein the second computing device is capable of communicating with a wireless network.

14. The system according to claim 1, wherein the second computing device is operable to issue at least one of an audible, a tactile and a textual alert of the updated information.

15. A system, comprising:
a first computing device operable to execute an application, to monitor the application for an update to information thereof and to transmit data reflective of the update; and
a second computing device, capable of remotely and continuously communicating with the first computing device to be receptive of the transmitted data, by which a non-distractive description of updated information of the application is automatically issuable to a user immediately following an occurrence of the update,
wherein a form of the non-distractive description is defined in accordance with an activity currently performed by the user and the updated information is filtered from a set of changes to the application in accordance with predefined filter rules and number of non-distractive descriptions issued can be reduced or increased in accordance with an authorized user preference, and a preference configuration screen is provided to allow the authorized user to achieve a desired configuration.

16. The system according to claim 15, further comprising a text-to-speech unit to generate the non-distractive description based on the updated information.

17. The system according to claim 16, wherein the text-to-speech unit is disposable in signal communication with at least one of the first and second computing devices.

18. A method for operating a system, the method comprising:
executing an application at a first computing device;
monitoring the application for an update to information thereof;
transmitting data reflective of the update;
identifying an activity currently performed by a user; and
automatically issuing to the user a non-distractive description of updated information of the application in a form defined in accordance with the activity currently performed by the user immediately following an occurrence of the update at a second computing device, which is capable of remotely and continuously communicating with the first computing device to be receptive of the transmitted data;
wherein the updated information is filtered from a set of changes to the application in accordance with predefined filter rules and number of non-distractive descriptions issued can be reduced or increased in accordance with an authorized user preference and a preference configuration screen is provided to allow the authorized user to achieve a desired configuration.

19. The method according to claim 18, wherein the application comprises a calendar application and the issuing comprises:
converting an updated calendar entry of the calendar application into a speech file; and
audibly issuing the speech file.

20. A system, comprising:
a first computing device operable to execute at least one of a calendar, a scheduling and an email application; and
a second computing device, capable of remotely and continuously communicating with the first computing device, by which a non-distractive description of updated information of the at least one of the calendar, the scheduling and the email application is automatically issuable to a user immediately following an occurrence of an update by which the updated information is provided to the at least one of the calendar, the scheduling and the email application,
wherein the second computing device is configured to identify that an activity currently performed by the user is driving and provides the non-distractive description in a form of a recorded audible message in accordance with the driving;
wherein the updated information is filtered from a set of changes to at least one of the calendar, the scheduling and the email application in accordance with predefined filter rules and number of non-distractive descriptions issued can be reduced or increased in accordance with an authorized user preference and a preference configuration screen is provided to allow the authorized user to achieve a desired configuration.

* * * * *